(12) United States Patent
Nobumori et al.

(10) Patent No.: US 9,799,455 B2
(45) Date of Patent: Oct. 24, 2017

(54) ELECTRODE FOR CAPACITORS AND CAPACITOR USING SAME

(71) Applicant: Panasonic Intellectual Property Management Co., Ltd., Osaka (JP)

(72) Inventors: Chiho Nobumori, Hyogo (JP); Motohiro Sakata, Osaka (JP); Mitsuhiro Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 14/439,193

(22) PCT Filed: Nov. 1, 2013

(86) PCT No.: PCT/JP2013/006480
§ 371 (c)(1),
(2) Date: Apr. 28, 2015

(87) PCT Pub. No.: WO2014/073190
PCT Pub. Date: May 15, 2014

(65) Prior Publication Data
US 2015/0302994 A1 Oct. 22, 2015

(30) Foreign Application Priority Data
Nov. 9, 2012 (JP) .................................. 2012-247067
Oct. 8, 2013 (JP) .................................. 2013-210788

(51) Int. Cl.
*H01G 11/28* (2013.01)
*H01G 9/048* (2006.01)
(Continued)

(52) U.S. Cl.
CPC ............ *H01G 9/048* (2013.01); *H01G 9/02* (2013.01); *H01G 9/042* (2013.01); *H01G 9/145* (2013.01);
(Continued)

(58) Field of Classification Search
CPC ............................... H01G 11/24; H01G 11/28
(Continued)

(56) References Cited

U.S. PATENT DOCUMENTS

| 8,654,508 B2 * | 2/2014 | Kondou | H01G 11/06 361/502 |
|---|---|---|---|
| 2012/0081838 A1 * | 4/2012 | Costantino | H01B 1/04 361/502 |
| 2012/0134071 A1 * | 5/2012 | Sadoway | B82Y 30/00 361/502 |

FOREIGN PATENT DOCUMENTS

| JP | 1-223714 | 9/1989 |
|---|---|---|
| JP | 3008399 B | 2/2000 |

(Continued)

OTHER PUBLICATIONS

International Search Report of PCT application No. PCT/JP2013/006480 dated Jan. 21, 2014.

*Primary Examiner* — Eric Thomas
(74) *Attorney, Agent, or Firm* — McDermott Will & Emery LLP

(57) ABSTRACT

A capacitor electrode includes a conductive base member and an electrode part electrically connected to the base member. The electrode part contains carbon particles of a first carbon material capable of adsorbing and desorbing ions. The electrode part further contains voids including first voids with diameters of not less than 0.2 μm and not more than 1.0 μm, and second voids with diameters of not less than 0.05 μm and less than 0.2 μm. The value of $(V_A \times V_A)/(V_B \times M)$ is greater than 0.022, where $V_A$ is the sum of the (Continued)

volumes of the first voids, $V_B$ is the sum of the volumes of the second voids, and M is the volume of the electrode part per unit weight of the electrode part.

16 Claims, 3 Drawing Sheets

(51) Int. Cl.
  *H01G 11/24* (2013.01)
  *H01G 11/26* (2013.01)
  *H01G 9/02* (2006.01)
  *H01G 9/042* (2006.01)
  *H01G 9/145* (2006.01)

(52) U.S. Cl.
  CPC ............ *H01G 11/24* (2013.01); *H01G 11/26* (2013.01); *Y02E 60/13* (2013.01); *Y02T 10/7022* (2013.01)

(58) Field of Classification Search
  USPC .......................................................... 361/502
  See application file for complete search history.

(56) References Cited

FOREIGN PATENT DOCUMENTS

| | | |
|---|---|---|
| JP | 2000-113876 | 4/2000 |
| JP | 2000-348726 | 12/2000 |
| JP | 2009-146580 | 7/2009 |

\* cited by examiner

ELECTRODE FOR CAPACITORS AND CAPACITOR USING SAME

TECHNICAL FIELD

The present invention relates to an electrode for capacitors used in various electronic apparatuses, in-car electrical storage devices, etc., and also relates to a capacitor including such an electrode.

BACKGROUND ART

Capacitors, which can be rapidly charged and discharged, have been developed as a standby power supply used when an abnormal state occurs in a main power supply of an electronic apparatus. Among these capacitors, electric double layer capacitors have been drawing particular attention because of their large capacitance. Positive and negative electrodes of an electric double layer capacitor contain activated carbon having a very large surface area to adsorb ions.

To improve characteristics of electric double layer capacitors, such as durability and temperature characteristics, it has been proposed that the ratio of the volume of the electrolytic solution with respect to the volume of the voids in the polarizable electrodes and in the separator be controlled in an appropriate range (for example, Patent Literature 1).

The currently available electric double layer capacitors, however, severely degrade their characteristics when repeatedly charged and discharged.

CITATION LIST

Patent Literature

PTL 1: Japanese Patent No. 3008399

SUMMARY OF THE INVENTION

The electrode for capacitors according to the present invention includes a conductive base member and an electrode part electrically connected to the base member. The electrode part contains carbon particles of a first carbon material capable of adsorbing and desorbing ions. The electrode part further contains therein voids including first voids with diameters of not less than 0.2 µm and not more than 1.0 µm and second voids with diameters of not less than 0.05 µm and less than 0.2 µm. The value of $(V_A \times VA)/(V_B \times M)$ is greater than 0.022, where $V_A$ is the sum of the volumes of the first voids, $V_B$ is the sum of the volumes of the second voids, and M is the volume of the electrode part, respectively, per unit weight of the electrode part.

This configuration prevents the capacitor including the electrode of the present invention from seriously degrading its characteristics, such as an increase in resistance over long-term charge-discharge cycling, thereby allowing the capacitor to have longevity.

DESCRIPTION OF EMBODIMENT

Figure 1:
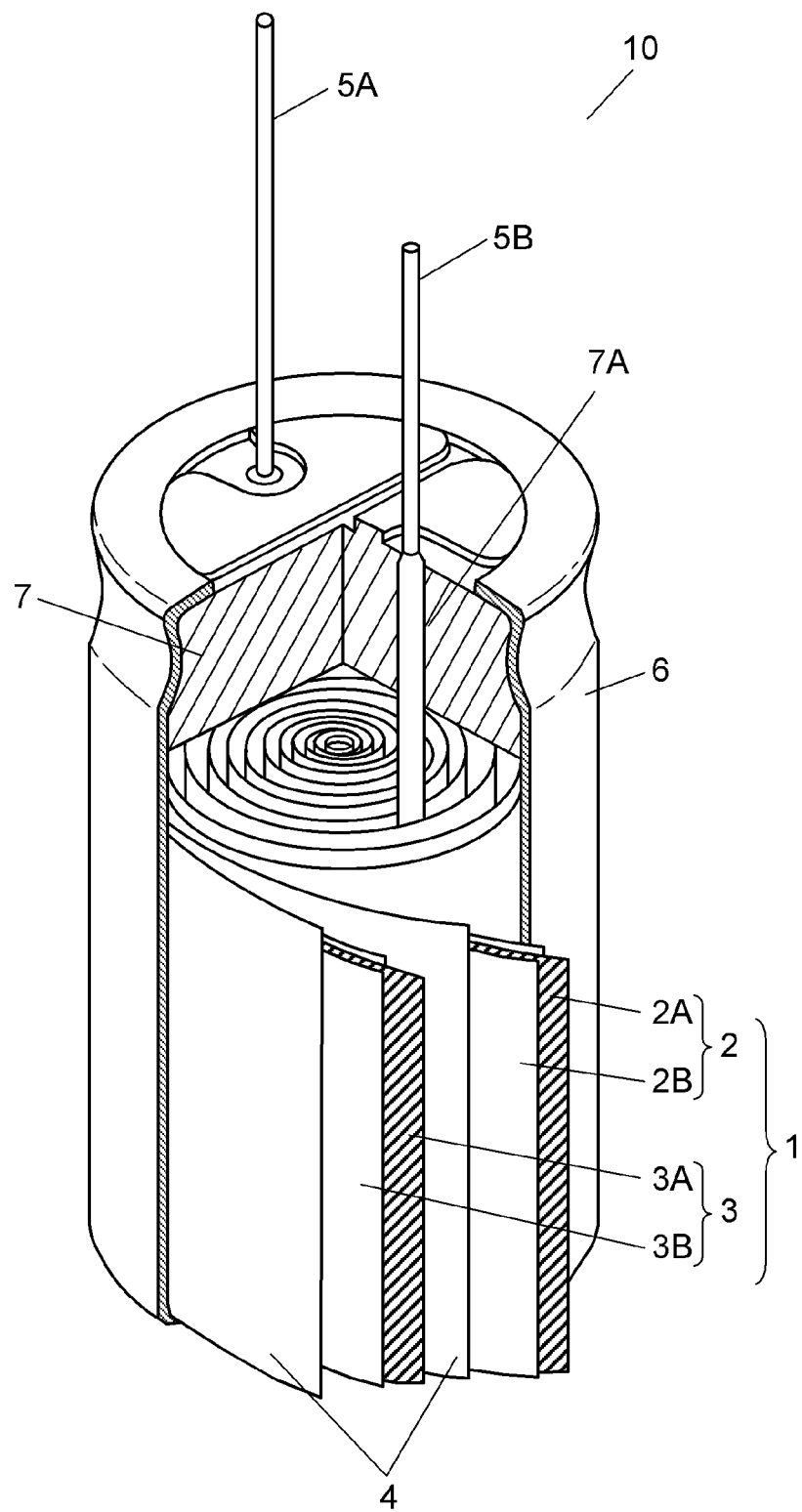
FIG. 1 is a partially cutaway perspective view of a capacitor according to an exemplary embodiment of the present invention.

FIG. 1 is a cutaway perspective view of capacitor 10 according to an exemplary embodiment of the present invention. Capacitor 10 includes capacitor element (hereinafter, element) 1, bottomed outer case (hereinafter, case) 6 and sealing member 7 as an exterior package, and electrolytic solution (not shown).

Element 1 includes positive electrode 2 and negative electrode 3 disposed opposite to each other, and separator 4 sandwiched between them, all of which are wound together. Alternatively, element 1 may be a laminated body including positive electrode 2, negative electrode 3, and separator 4 sandwiched between them. The electrolytic solution is sandwiched between positive electrode 2 and negative electrode 3.

Positive electrode 2 includes current collector 2A as a conductive base member and electrode part 2B formed on the surface of current collector 2A. Similarly, negative electrode 3 includes current collector 3A as a conductive base member and electrode part 3B formed on the surface of current collector 3A. Electrode parts 2B and 3B adsorb and desorb ions during charge and discharge of capacitor 10. In other words, electrode parts 2B and 3B are electrically connected respectively to current collectors 2A and 3A, and each of electrode parts 2B and 3B contains carbon particles of a carbon material (first carbon material) capable of adsorbing and desorbing ions, and also contains voids.

Positive and negative electrodes 2 and 3 are connected respectively to lead wires 5A and 5B, which are lead-out members. In this situation, element 1 and the electrolytic solution are accommodated in case 6. Sealing member 7 seals the open end of case 6 with lead wires 5A and 5B extended outside.

The configuration of positive electrode 2 and negative electrode 3 will now be described in detail as follows. Current collectors 2A and 3A are made, for example, of about 15 µm-thick high-purity aluminum foil (Al of at least 99% purity). Before being used as current collectors 2A and 3A, the aluminum foil is subjected to electrolytic etching in a chlorine-based etchant so as to roughen the surfaces thereof.

Electrode parts 2B and 3B are formed on the roughened front and rear surfaces of current collectors 2A and 3A, respectively. Each of electrode parts 2B and 3B includes activated carbon as an example of the carbon material, a binder, and a conductive additive.

An example of the activated carbon, which is a carbon material for adsorbing and desorbing ions in electrode parts 2B and 3B, is phenol resin-based activated carbon with an average particle size of 1 to 10 µm. Other examples of the activated carbon used for electrode parts 2B and 3B include carbon materials made from coconut shells, wood powders, papers, coal cokes, petroleum cokes, petroleum pitches, and carbon gels prepared by sol-gel polymerization.

The binder can be, for example, polytetrafluoroethylene (PTFE). It is also possible to add a dispersant such as carboxymethylcellulose (CMC). The conductive additive can be, for example, acetylene black or other carbon blacks. The activated carbon, the conductive additive, the dispersant, and the binder are mixed together in a weight ratio of, for example, 88:5:5:2. The resultant mixture is kneaded by a kneader until a predetermined viscosity is attained.

The resultant paste is applied to the front and rear surfaces of current collectors 2A and 3A, dried in an air atmosphere at 100° C., and pressed by a press machine. This results in electrode parts 2B and 3B having a thickness of, for example, 40 µm. Next, current collectors 2A and 3A, which are respectively provided with electrode parts 2B and 3B, are cut to width by slitting.

Electrode parts 2B and 3B formed on the front and rear surfaces of current collectors 2A and 3A are partially removed, and then lead wires 5A and 5B are connected by needle caulking or other methods to the exposed portions of current collectors 2A and 3A.

Positive electrode 2 and negative electrode 3 thus prepared are disposed opposite to each other and wound together with separator 4 sandwiched between them, thereby completing element 1. Separator 4 can be made, for example, from cellulosic paper with a thickness of about 35 µm and a density of 0.45 g/cm$^3$, or be made from fluorine-based material such as polytetrafluoroethylene.

An example of the electrolytic solution is ethyltrimethylammonium tetrafluoroborate (ETMA$^+$ BF$_4^-$), which is a quaternary ammonium salt. To obtain better withstand voltage characteristics, it is preferable that the anions of the solute contain fluorine atoms, and more preferably contain BF$_4^-$ or PF$_6^-$. The solvent of the solution can be, for example, γ-butyrolactone, which is an organic solvent. The solute has a concentration of 0.5 to 2.0 mol/l.

Case 6 is made, for example, of aluminum, copper, or nickel because of their good heat-release characteristics, but may alternatively be made of other materials that hardly react with the electrolytic solution. Case 6 may have a rectangular column shape instead of a cylindrical shape, and may be a laminated bag or a resin case.

Sealing member 7 can be made of butyl rubber. However, the material of sealing member 7 is not limited as well as it is elastic rubber material.

The opening of case 6 is sealed as follows. First, lead wires 5A and 5B projecting from element 1 are passed through through-holes 7A formed in sealing member 7. In this situation, sealing member 7 is placed into the opening of case 6. Next, the outer peripheral surface of case 6 is squeezed inwardly at the position corresponding to sealing member 7. Then, the open end of case 6 is curled. Sealing member 7 is compressed and fixed in that manner to seal the opening of case 6.

In capacitor 10, the voids formed in electrode part 2B (3B) include first voids with diameters of not less than 0.2 µm and not more than 1.0 µm and second voids with diameters of not less than 0.05 µm and less than 0.2 µm. Assume that the sum of the volumes of the first voids, the sum of the volumes of the second voids, and the volume of electrode part 2B (3B), respectively, per unit weight of electrode part 2B (3B) are denoted as $V_A$, $V_B$, and M, respectively. On this assumption, the value of α calculated by the following formula (A) containing these constant values is greater than 0.022.

$$\alpha = (V_A \times V_A)/(V_B \times M) \quad (A)$$

This configuration prevents the electric double layer capacitor from seriously degrading its characteristics, especially the resistance at low temperatures over long-term charge-discharge cycling.

One of positive and negative electrodes 2 and 3 may have a different configuration from the above-described configuration. In that case, the one of positive and negative electrodes 2 and 3 that has the above-described configuration is referred to as a first electrode of the present exemplary embodiment, and the other that has the different configuration is referred to as a second electrode.

The present exemplary embodiment describes, as an example of the capacitor, an electric double layer capacitor in which the capacitor electrode of the present exemplary embodiment is used for both positive electrode 2 and negative electrode 3. The capacitor according to the present exemplary embodiment, however, is not limited to an electric double layer capacitor. For example, the capacitor may include, as a positive electrode, the capacitor electrode according to the present exemplary embodiment; a negative electrode made of at least one of a carbon material, a silicon compound, and a metal oxide, which contains lithium ions absorbed therein; and electrolytic solution containing a lithium salt. The capacitor may alternatively include as a negative electrode the capacitor electrode according to the present exemplary embodiment; a positive electrode made of at least one of a nickel hydroxide and a nickel oxide; and electrolytic solution containing water as a solvent.

The fact that the value of α is greater than 0.022 means that large-diameter voids occupy a relatively large proportion of the numerous voids existing among the carbon particles in electrode part 2B (3B) and also have a large absolute amount. Such conditions are considered to smooth the diffusion of ions inside the fine pores of the (activated) carbon particles and around the carbon particles, which adsorb and desorb ions during charge and discharge. In consideration of the ions and the solvent moving in and out the fine pores of the carbon particles during charge and discharge, a sufficient amount of voids with the predetermined sizes allows the volume corresponding to the amount of the ions and the solvent to move. For this reason, it is preferable that voids that allow the displacement of a specific amount of the moving volume be present around the carbon particles.

Furthermore, controlling the value of α in the structure of electrode part 2B (3B) allows both using a carbon material with large capacitance as well as extending the life of electrode part 2B (3B). Thus, an increase in both the capacitance and the life, which are in a trade-off relationship, can be achieved. Thus, the characteristic degradation due to the use of a carbon material with large capacitance can be reduced. This allows the capacitor to maintain the charge-discharge characteristics more stably, and hence to repeat charge and discharge under severer conditions and environments such as higher voltages. For example, the charge-discharge characteristics can be maintained stably even under the application of a voltage of 2.5 V or more.

The value of α can express not only the occupancy of the voids having the above-mentioned predetermined sizes but also the degree of satisfaction of the absolute amount at the same time, which are required to make the ions in the electrolytic solution diffuse into electrode part 2B (3B) under the void conditions of electrode part 2B (3B). The value of α only needs to be more than 0.022, and does not have an upper limit. In short, the greater the value of α, the better for the electrode.

As a method of checking the above-described void distribution, the present exemplary embodiment employs mercury porosimetry, which is performed as follows. First, mercury is poured into fine pores of a sample at low pressure to measure the diameters of fine pores with larger diameters. Next, the mercury is made to go deeper into the fine pores at high pressure to detect the conditions of fine pores with smaller diameters in the sample from the pressure fluctuation. The low pressure condition, which is about 50 μm Hg, is achieved using a vacuum pump. The mercury can be poured into the sample by, for example, using a cell that accommodates the sample and has a hole for pouring the mercury into the cell. The sample is prepared by cutting a 10 mm×100 mm piece of a sheet-like electrode including the current collector where electrode part 2B or 3B is made, and then accordion-folding the cut piece every 10 mm longitudinally. For measurement, the accordion-folded sample is made to stand so that the longitudinal side can be in parallel with the placing face. The high pressure under which the mercury is pressed into the sample is about 230 MPa. The high pressure condition is achieved by using a hydraulic pump.

The dispersibility of the particles when preparing the paste for electrode parts 2B and 3B can be a factor to control the volume of the voids in electrode parts 2B and 3B. When the dispersibility is not high enough, aggregates of the carbon particles greatly vary in size, which is considered to cause uneven spaces among the aggregates in electrode parts 2B and 3B.

It is preferable that the carbon particles contained in electrode parts 2B and 3B have many fine pores with large diameters (pore diameters). When the carbon particles have many fine pores with large pore diameters, the fine pore portions are considered to show elasticity like a sponge when electrode parts 2B and 3B are pressed. This feature probably allows the carbon particles to react to the stress applied by pressing and to maintain or almost maintain their original shapes without deformation or breakage after pressing, ensuring that voids among the particles have the predetermined sizes.

In order to obtain this effect, the fine pores of the (activated) carbon particles used in the present exemplary embodiment include meso pores (first pores) with diameters of not less than 2 nm and not more than 50 nm and micro pores (second pores) with diameters of less than 2 nm. It is preferable that the ratio of the sum of the volumes of the meso pores with respect to the sum of the volumes of the micro pores be at least 0.2. It is also preferable that the ratio of the sum of the volumes of the meso pores with respect to the sum of the volumes of all pores in the carbon particles be at least 0.2. The fine pores in such conditions are compatible with an electrolytic solution containing ions capable of penetrating into planar narrow fine pores. As the planar ions contained in the electrolytic solution, the ions expressed by the following formula (1) are preferable. The most preferable example is 1-ethyl-2,3-dimethylimidazolium.

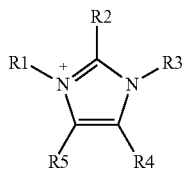

(1)

where R1, R2, R3, R4, and R5 independently represent either a hydrogen atom or an alkyl group having 1 to 10 carbon atoms; two or more of R1 to R5 may be the same, and the carbon atoms contained in R1 to R5 may be bonded to form a ring structure.

In the case of using three-dimensional ions such as ethyltrimethylammonium ions ($ETMA^+$), it is preferable in the carbon particles that the ratio of the sum of the volumes of the meso pores with respect to the sum of the volumes of the micro pores be at least 0.25, and that the ratio of the sum of the volumes of the meso pores with respect to the sum of all volumes of the pores in the carbon particles be at least 0.2. Examples of such ions include quaternary ammonium ions that have an ethyl or methyl group as a substituent.

The planar ions can penetrate into slits with approximately the same width as the thickness of the ions. The three-dimensional ions, on the other hand, are considered to be difficult to penetrate into these slits. For this reason, the three-dimensional ions require carbon particles with larger-diameter pores than the planar ions.

Another method of controlling the amount of voids in electrode parts 2B and 3B is to use a means of controlling the voids in electrode parts 2B and 3B, separately from the carbon material (activated carbon) that generates a capacitance during charge and discharge. For example, it is possible to use carbon particles of a first carbon material (activated carbon), and carbon particles of a second carbon material (activated carbon). The first carbon material has a main function of generating a capacitance during charge and discharge, whereas the second carbon material has a main function of controlling the voids in electrode parts 2B and 3B.

In electrode parts 2B and 3B, in order to ensure the capacitance, it is preferable to use the first carbon material as a main material, and the second carbon material as an auxiliary material. In other words, it is preferable that a weight content of the carbon particles of the first carbon material is greater than that of the carbon particles of the second carbon material in electrode parts 2B and 3B. On the other hand, it is preferable in order to satisfy the void conditions that a total volume of the fine pores of the carbon particles of the second carbon material is greater than that of the fine pores of the carbon particles of the first carbon material.

It is also preferable that the pores in the carbon particles of the second carbon material have meso pores (third pores) with diameters of not less than 2 nm and not more than 50 nm, and micro pores (fourth pores) with diameters of less than 2 nm. It is also preferable that the ratio of the sum of the volumes of the meso pores to the sum of the volumes of the micro pores in the carbon particles of the second carbon material is larger than that of the carbon particles of the first carbon material.

Note that in this method of controlling the voids, the auxiliary material does not need to be necessarily a carbon material, and may be made of a porous material that satisfies the above requirements. For example, the carbon particles of the second carbon material may be replaced by porous particles with pores on their surfaces.

Figure 2:
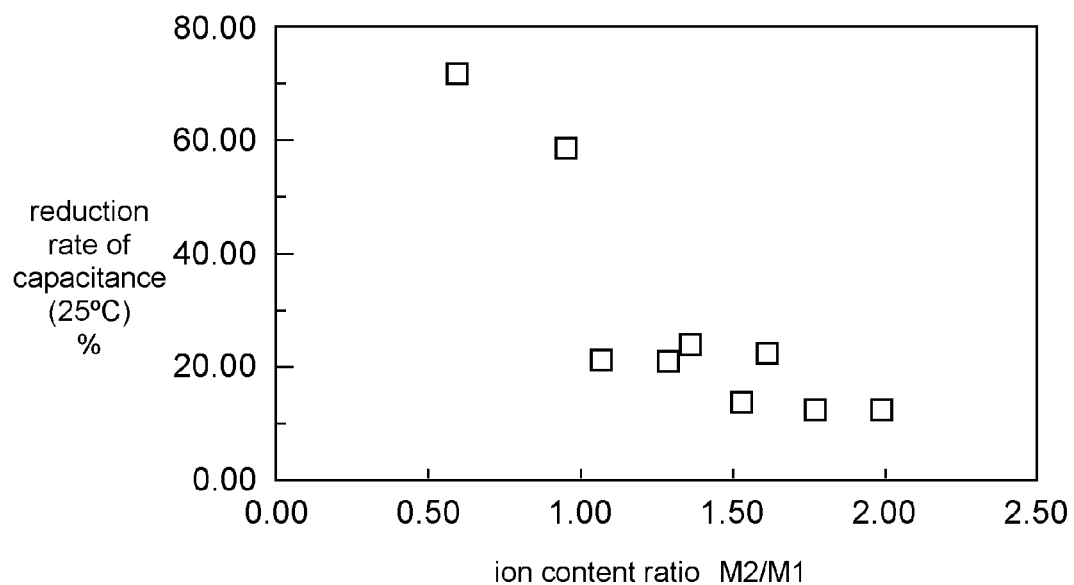
FIG. 2 is a graph showing the relation between the ion content ratio M2/M1 and the reduction rate of capacitance of the capacitor according to the exemplary embodiment of the present invention.
Figure 3:
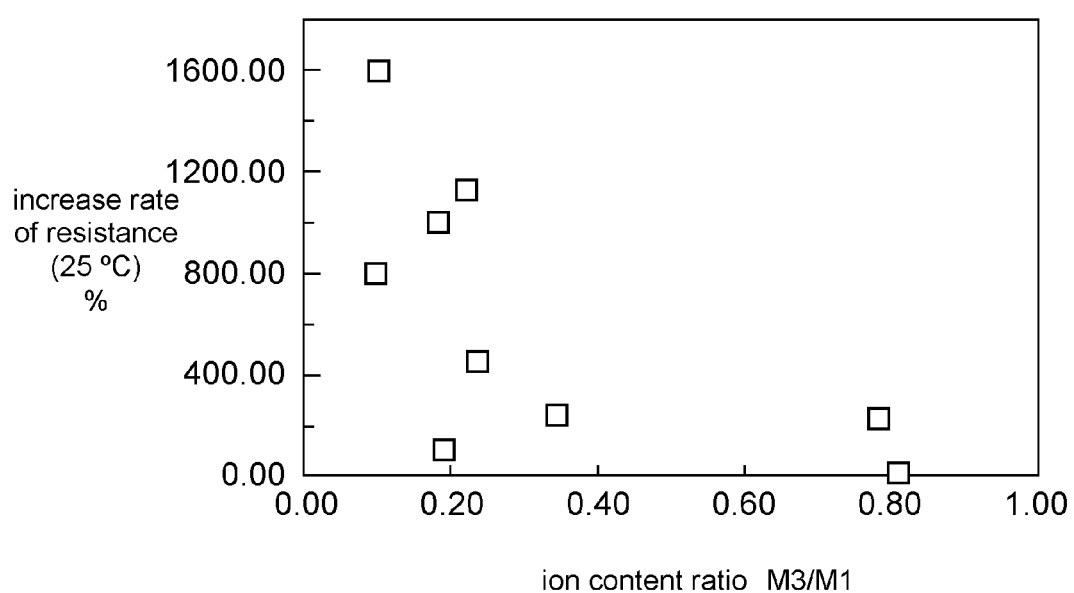
FIG. 3 is a graph showing the relation between the ion content ratio M3/M1 and the increase rate of resistance of the capacitor according to the exemplary embodiment of the present invention.

The following is a description, with reference to FIGS. 2 and 3, of the influence of the ion content M2 in electrode parts 2B and 3B on the reduction rate of capacitance of capacitor 10, and the influence of the ion content M3 in the meso pores of the carbon particles on the increase rate of resistance of capacitor 10. FIG. 2 is a graph showing the relation between M2/M1, which is the ratio of the ion content M2 to the ion content M1 required for the generation of a predetermined capacitance, and the reduction rate of capacitance at 25° C. FIG. 3 is a graph showing the relation between M3/M1, which is the ratio of the ion content M3 to the ion content M1, and the increase rate of resistance at 25° C.

The data shown in FIGS. 2 and 3 have been obtained by a test described below. First, Samples 1-9 having specifications shown in Tables 1-4 are prepared as capacitors.

TABLE 1

| Sample No. | fine-pore volume (ml/g) | |
| --- | --- | --- |
| | total volume | meso pores |
| 1 | 1.05 | 0.32 |
| 2 | 1.34 | 0.75 |
| 3 | 0.87 | 0.17 |
| 4 | 1.25 | 0.59 |
| 5 | 1.07 | 0.11 |
| 6 | 0.97 | 0.15 |
| 7 | 1.12 | 0.24 |
| 8 | 0.93 | 0.12 |
| 9 | 1.38 | 0.25 |

TABLE 2

| | electrode part | | | | carbon particles | | |
| --- | --- | --- | --- | --- | --- | --- | --- |
| Sample No. | measured density (g/ml) | theoretical density (g/ml) | porosity (%) | amount of voids (ml) | measured density (g/ml) | weight (g) | fine-pore volume (ml) |
| 1 | 0.394 | 0.796 | 50.5 | 0.84 | 0.344 | 0.57 | 0.60 |
| 2 | 0.329 | 0.701 | 53.0 | 0.88 | 0.287 | 0.48 | 0.64 |
| 3 | 0.474 | 0.876 | 46.0 | 0.76 | 0.413 | 0.69 | 0.60 |
| 4 | 0.420 | 0.727 | 42.3 | 0.70 | 0.367 | 0.61 | 0.76 |
| 5 | 0.389 | 0.787 | 50.7 | 0.84 | 0.339 | 0.56 | 0.60 |
| 6 | 0.507 | 0.829 | 38.8 | 0.64 | 0.442 | 0.73 | 0.71 |
| 7 | 0.351 | 0.770 | 54.4 | 0.90 | 0.306 | 0.51 | 0.57 |
| 8 | 0.457 | 0.848 | 46.1 | 0.76 | 0.399 | 0.66 | 0.61 |
| 9 | 0.493 | 0.691 | 2.86 | 0.47 | 0.430 | 0.71 | 0.98 |

TABLE 3

| | electrode part | | ion content | | | |
| --- | --- | --- | --- | --- | --- | --- |
| Sample No. | capacitance per weight (F/g) | capacitance (F) | required ion content (mmol) | in voids (mmol) | total in fine pores (mmol) | in meso pores (mmol) |
| 1 | 28.2 | 16.1 | 0.47 | 0.75 | 0.54 | 0.16 |
| 2 | 28.8 | 13.7 | 0.40 | 0.79 | 0.58 | 0.32 |
| 3 | 26.8 | 18.3 | 0.53 | 0.69 | 0.54 | 0.10 |
| 4 | 23.4 | 14.2 | 0.41 | 0.63 | 0.68 | 0.32 |
| 5 | 34.0 | 19.1 | 0.55 | 0.76 | 0.54 | 0.05 |
| 6 | 25.4 | 18.7 | 0.54 | 0.58 | 0.64 | 0.10 |
| 7 | 31.0 | 15.8 | 0.46 | 0.81 | 0.51 | 0.11 |
| 8 | 37.4 | 24.8 | 0.72 | 0.69 | 0.55 | 0.07 |
| 9 | 34.6 | 24.7 | 0.72 | 0.60 | 1.24 | 0.22 |

TABLE 4

| | the ratio of the ion content in each region with respect to the required ion content | | |
| --- | --- | --- | --- |
| Sample No. | M2/M1 in voids | total in fine pores | M3/M1 in meso pores |
| 1 | 1.61 | 1.15 | 0.35 |
| 2 | 1.99 | 1.45 | 0.81 |
| 3 | 1.29 | 1.01 | 0.19 |
| 4 | 1.53 | 1.65 | 0.78 |
| 5 | 1.36 | 0.98 | 0.10 |
| 6 | 1.07 | 1.18 | 0.18 |
| 7 | 1.77 | 1.12 | 0.24 |
| 8 | 0.96 | 0.77 | 0.10 |
| 9 | 0.43 | 0.89 | 0.16 |

Each sample is subjected to a float test for 500 hours at 60° C. and 2.8 V to measure the reduction rate of capacitance and the increase rate of resistance before and after the test. The reduction rate of capacitance, expressed in percentage, is the value of the difference between the initial capacitance measured at 25° C. and the capacitance measured after the float test divided by the initial resistance. The increase rate of resistance, expressed in percentage, is the value of the difference between the initial resistance measured at 25° C. and the resistance measured after the float test divided by the initial resistance. The initial capacitance and resistance as well as the capacitance and resistance after the test are measured by the method specified in IEC 62391-1.

The property values shown in Tables 1-4 are calculated by the following method.

The ion content M1 required to generate the predetermined capacitance is calculated by multiplying the capacitance C (F) detected when the capacitor characteristics are measured at 25° C. by the voltage applied to the capacitor, and dividing the product by the Faraday constant. The capacitance value can be, for example, the product of the capacitance per unit weight (F/g) measured as the capacitor and the total weight (g) of the electrode part.

The ion content M2 in the voids is calculated by multiplying the volumes of all spaces (the voids among the carbon particles and the fine pores of the carbon particles) by the concentration of the electrolytic solution. It is assumed that each of the spaces is sufficiently filled with the electrolytic solution. The volumes of the voids are calculated as follows. First, the porosity (%) of the electrode part is calculated by calculating the difference between the theoretical density (g/ml) of the entire electrode part and the measured density (g/ml) thereof, and dividing the difference by the theoretical density. The obtained porosity is multiplied by the volume of the electrode part so as to calculate the total void volume (ml). Note that the theoretical density of the electrode part is calculated based on the real density (ml/g) of each of the carbon material, the conductive additive, and the binder which have been measured already and also on the content ratio of these components. The theoretical density of the electrode part is a density on the assumption that the materials of the electrode part have no fine pores inside and no voids between them. The sum of the reciprocal of the real density of the carbon material and the fine-pore volume per unit weight is calculated, and the reciprocal of the sum is referred to as the theoretical density of the carbon material.

Next, the sum of the fine-pore volumes of the carbon particles is calculated as follows. The content ratio of the carbon particles in the electrode part is multiplied by the measured density of the electrode part so as to calculate the measured density (g/ml) of the carbon particles. Then, the total weight (g) of the carbon particles is calculated from the volume (ml) of the electrode part. Then the total fine-pore volume (ml) is calculated from the total weight (g) of the carbon particles thus calculated and the already calculated fine-pore volume (ml/g) per unit weight of the carbon particles. The total volume (ml) of meso pores is calculated from the ratio of the meso-pore volume with respect to the total fine-pore volume, and is used to calculate the ion content M3.

In Tables 1-4, samples 1-9 have an electrode part with a volume of 1.66 ml and an electrolytic solution with a concentration of 0.9 M, and are supplied with a voltage of 2.8 V. Besides the carbon particles of the carbon material (activated carbon), the electrode part includes acetylene black with a real density of 1.8 g/ml, CMC with a real density of 1.3 g/ml, and PTFE with a real density of 2.16 g/ml. The electrode part contains these four kinds of materials in a weight ratio of 87:6:5:2.

The plots in the graphs shown in FIGS. 2 and 3 are based on the data contained in foregoing Table 4 and Table 5 shown below.

TABLE 5

| Sample No. | capacity reduction rate (%) | resistance increase rate (%) |
| --- | --- | --- |
| 1 | 22.35 | 237.70 |
| 2 | 12.63 | 13.54 |
| 3 | 20.85 | 97.08 |
| 4 | 13.91 | 220.14 |
| 5 | 23.84 | 793.80 |
| 6 | 21.28 | 1004.28 |
| 7 | 12.49 | 452.82 |
| 8 | 58.57 | 1600.31 |
| 9 | 71.55 | 1131.45 |

As known from FIG. 2, in order to reduce the degradation in the characteristics of capacitor 10, it is preferable that the ratio of the ion content M2 (the content of the electrolytic solution) in the electrode part with respect to the ion content M1 required for the generation of a predetermined capacitance be not less than a certain value. More specifically, it is preferable that M2/M1, which is the ratio of the ion content M2 in all spaces (the voids between the particles and the fine pores of the carbon particles) contained in electrode parts 2B and 3B with respect to the ion content M1, be at least 1. Adjusting the ion content in electrode parts 2B and 3B in this manner prevents capacitor 10 from seriously degrading its characteristics such as the resistance over long-term charge-discharge cycling. To perform charge and discharge, ions need to go into and come out of the fine pores of the carbon particles. Therefore, it is preferable that at least a certain amount of ions be held in the voids formed among the carbon particles in electrode parts 2B and 3B both as sources of supply of ions that are going into the carbon particles and as areas for holding ions that have come out of the activated carbon.

In the space to form electrode parts 2B and 3B, the ion content in the voids between the carbon particles is particularly important for the following reason. If the fine pores of the carbon particles near the sites of capacitance generation function as the ion holding areas, both cations and anions are present near the fine pore surfaces of the carbon particles that are the ion-adsorbing sites. However, if a large number of ions polarized oppositely to the ions playing a role in the capacitance generation are present in the sites of capacitance generation, these ions are considered to have an adverse effect on the ions playing the role in the capacitance generation. When the ion holding areas are formed far from the voids between the particles, such as in separator 4, the distance to the surface of the carbon particles is too large to ensure proper charge and discharge.

In fact, the electrolytic solution in capacitor 10 is present not only in electrode parts 2B and 3B but also in the pores of separator 4, and excess electrolytic solution may overflow from element 1 and be accommodated in case 6. Hence, the ion content ratio M2/M1 may be smaller than 1. That is, it does not necessarily mean that an electric double layer capacitor cannot generate a predetermined capacitance when the ion content M2 in the above-described voids is insufficient with respect to the ion content M1 required for the capacitance generation. In that case, however, the lack of the ion content is compensated by the ions in separator 4 or outside element 1 to generate the capacitance. As a result, it takes longer to generate the predetermined capacitance.

The graph of FIG. 3 indicates that when M3/M1, which is the ratio of the ion content M3 of the meso pores of the carbon particles with respect to the ion content M1, is greater than 0.2, the resistance increase rate remains low and stable.

The effect of employing electrodes including different electrode parts with different values of α calculated by the formula (A) will now be described using specific examples. More specifically, the following is a description of the evaluation results of the change in reliability with the passage of time of electric double layer capacitors including the electrodes shown as Samples A-F in Table 6.

TABLE 6

| Sample | average particle size $D_{50}$ (μm) | meso-pore volumes/micro-pore volumes | meso-pore volumes/total volume |
| --- | --- | --- | --- |
| A | 3.2 | 0.13 | 0.12 |
| B | 2.9 | 0.16 | 0.14 |
| C | 3.9 | 0.19 | 0.15 |
| D | 4.2 | 0.60 | 0.37 |
| E | 4.0 | 0.58 | 0.37 |
| F | 5.3 | 0.60 | 0.41 |

The electrodes shown as Samples A-F have different void conditions in the electrode parts, especially the value of α calculated from the conditions of the sums VA and VB of the void volumes. Table 6 shows the average particle size D50, the ratio of the meso-pore volumes to the micro-pore volumes, and the ratio of the meso-pore volumes to the total volume of the fine pores, respectively of each of the (activated) carbon particles used in the electrode parts of Samples A-F. The micro-pore volumes are measured by the MP method, whereas the meso-pore volumes are measured by the Dollimore-Heal (DH) method. The total volume of the fine pores is calculated by adding the micro-pore volumes and the meso-pore volumes measured as above. The electrode parts shown as Samples A-F have the same conditions as in Samples 1-9, such as the composition and mixing ratio of the binder and the dispersant, and drying and pressing conditions.

Figure 4:
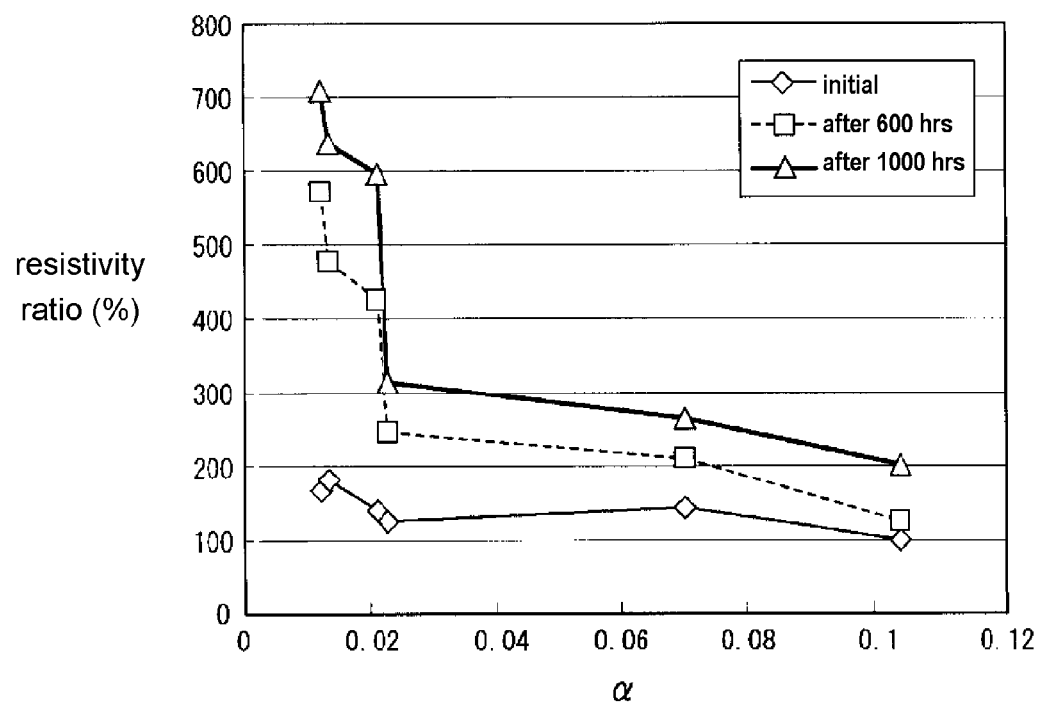
FIG. 4 is a graph showing the relation between the value of α and the initial resistance of the capacitor according to the exemplary embodiment of the present invention.

The void conditions and the resistivity at −30° C. as low-temperature characteristics of each sample are shown in Table 7. The relation between the value of α and the resistivity of each sample is shown in FIG. 4.

The resistivity is obtained by multiplying the resistance of the capacitor measured by the method specified in IEC 62391-1 by the area of the electrode part and dividing the product by the thickness of the electrode part. In order to compare the resistivity of each sample at different times (initial, after 600 hours, and after 1000 hours), Table 7 and FIG. 4 use the initial resistivity value of Sample F as a criterion, and the ratio of each resistivity value with respect this value is expressed in percentage as the resistivity ratio. In this test, electric double layer capacitors including the respective electrodes of the samples are subjected to a voltage of 2.8 V at 60° C. as load conditions, and the resistivity of each capacitors is evaluated when a certain period of time has elapsed.

TABLE 7

| Sample | $V_A$ (ml/g) | $V_B$ (ml/g) | electrode part volume M (ml/g) | α | initial resistivity ratio (%) | after 600 h resistivity ratio (%) | after 1000 h resistivity ratio (%) |
|---|---|---|---|---|---|---|---|
| A | 0.0226 | 0.0198 | 2.13 | 0.0122 | 166.9 | 571.2 | 708.0 |
| B | 0.0214 | 0.0159 | 2.13 | 0.0134 | 181.7 | 476.4 | 636.5 |
| C | 0.0131 | 0.0041 | 1.96 | 0.0211 | 140.1 | 425.1 | 595.1 |
| D | 0.0221 | 0.0084 | 2.52 | 0.0227 | 125.3 | 246.4 | 315.5 |
| E | 0.0361 | 0.0090 | 2.06 | 0.0702 | 144.1 | 210.1 | 264.4 |
| F | 0.0320 | 0.0037 | 2.58 | 0.1044 | 100.0 | 125.0 | 201.8 |

Table 7 and FIG. 4 indicate that Samples C and D are very different from each other in the characteristics of the electric double layer capacitors. More specifically, Table 7 shows a large difference between samples with a value of α of not more than 0.022 and those with a value of α of greater than 0.022. In Samples A-C with a value of a of not more than 0.022, the resistivity greatly changes as the load is applied for a longer period of time. In contrast, in Samples D-F with a value of α of greater than 0.22, the resistivity somewhat increases as the load is applied for a longer period of time, but the increase range is smaller than in Samples A-C. This indicates that an electric double layer capacitor has a significantly extended lifespan when including an electrode that has an electrode part with a value of a of greater than 0.022.

Figure 5:
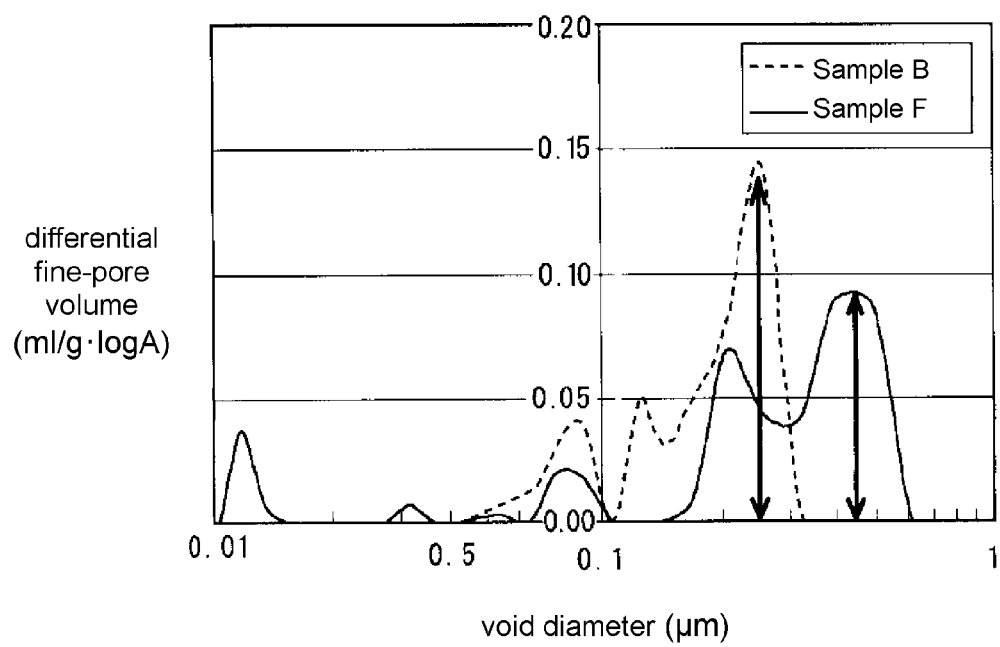
FIG. 5 is a graph showing the void distribution of an electrode part according to the exemplary embodiment of the present invention.

FIG. 5 is a graph showing the void volume distribution with respect to the void diameters of Samples F and B, which are measured with a mercury porosimeter. The horizontal axis in FIG. 5, which represents the void diameter, is a logarithmic axis. As shown in FIG. 5, in the range of 0.05 μm to 1.0 μm of the void diameter, Sample B has a maximum peak of the void-volume distribution between 0.2 μm and 0.3 μmm, inclusive whereas Sample F has a maximum peak of the void-volume distribution between 0.3 μm and 0.6 μm, inclusive.

As described above, the difference in location of the maximum peak also indicates that Sample F including the electrode part according to the present exemplary embodiment has a large number of great voids in the vicinity of the carbon particles composing the electrode part. Hence, the diameters of the voids ranging from 0.05 μm to 1.0 μm have a maximum peak preferably between 0.3 μm and 0.6 μm, inclusive and more preferably between 0.4 μm and 0.5 μm, inclusive. The electric double layer capacitor including an electrode part that has such a void distribution has excellent low-temperature characteristics over long-term use as shown in Table 7 and FIG. 4.

The above-described distribution conditions of the voids in the electrode part has the precondition that "in the voids with diameters ranging from 0.05 μm to 1.0 μm" in order to exclude from the distribution measurement results as many voids as possible that are outside the electrode part. If the distribution range includes the voids with diameters of not more than 0.05 μm, the fine pores in the carbon particles may also be detected. If, on the other hand, the distribution range includes the voids with extremely large diameters, recesses formed for some reason around the electrode part may also be detected.

In the void diameter distribution shown in FIG. 5, there may be a point at which the volume is 0 over the maximum peak observed at a predetermined void diameter and below the void diameter exceeding 1.0 μm. Such a point tends to be in the void diameter range of 0.2 μm to 1.0 μm. The data of Sample F shown in FIG. 5 contains a point where the volume is 0 near 0.7 μm. There are no voids detected over the volume of 0 below the void diameter of several tens of micrometers. For this reason, the voids with diameters of not more than 1.0 μm are evaluated as the voids contained in the electrode part according to the present exemplary embodiment.

In this test, the upper limit of the void diameter is defined as above because the void diameter distribution has specific tendencies as described above. In theory, however, the upper limit of the diameter of the target voids, which are assumed to be three-dimensional, is considered to be able to increase to the value of the thickness of the electrode part containing these voids.

The effect of employing, as porous particles, carbon particles of the second carbon material in order to control the voids in the electrode part will now be described using specific examples. Table 8 shows the specifications of the carbon particles of the first carbon material, which generates a capacitance, and the carbon particles of the second carbon material, which is added to control the voids in the electrode part. "Vtotal" represents the total volume of the fine pores of the carbon particles per unit weight; "Vmeso" represents the total volume of the meso pores of the carbon particles per unit weight; and "Vmicro" represents the total volume of the micro pores of the carbon particles per unit weight.

TABLE 8

| | fine-pore volume (ml/g) | | | median diameter (μm) |
|---|---|---|---|---|
| | Vtotal | Vmeso | Vmicro | |
| first carbon material | 0.93 | 0.12 | 0.81 | 8.00 |
| second carbon material | 2.20 | 2.20 | 0.00 | 5.00 |

These two kinds of carbon particles are mixed in the weight ratio shown in Table 9 so as to prepare the capacitors shown as Samples G-K. In the capacitors shown as Samples G-K, the respective electrode parts contain the first and second carbon materials in a weight ratio of 90:10, 80:20, 70:30, and 100:0, respectively. The electrode parts shown as Samples G-K have the same conditions as in Samples 1-9, such as the composition and mixing ratio of the binder and the dispersant, and drying and pressing conditions. Note that the carbon particles of the first and second carbon materials used in Samples G-K have the same proportion in the electrode part as the carbon particles of the first carbon material used in Samples 1-9.

TABLE 9

| Sample | content ratio | average fine pore volume (ml/g) | fine-pore volume ratio $\frac{V_{meso}}{V_{total}}$ | $\frac{V_{meso}}{V_{micro}}$ | ion ratio M2/M1 | α |
|---|---|---|---|---|---|---|
| G | 90:10 | 1.06 | 0.31 | 0.46 | 1.86 | 0.024 |
| H | 80:20 | 1.18 | 0.46 | 0.84 | 2.02 | 0.027 |
| J | 70:30 | 1.31 | 0.57 | 1.32 | 2.68 | 0.032 |
| K | 100:0 | 0.93 | 0.13 | 0.15 | 1.46 | 0.014 |

Next, the capacitors shown as Samples G-K are subjected to a load test in which a constant voltage of 2.5 V is applied for 520 hours at 85° C. These capacitors are measured for capacitance and resistance value at a normal temperature (25° C.) and a low temperature (−30° C.) before and after the load test, thereby comparing their characteristic degradation. In Table 10, each characteristic value represents, in percentage, the ratio the characteristic value of each sample with respect to that of Sample K at the start of each test. The normal temperature C and the low temperature C indicate the relative value of the capacitance at the normal and low temperatures, respectively. The normal temperature R and the low temperature R indicate the relative value of the resistance of the normal and low temperatures, respectively.

TABLE 10

| Sample | normal temperature C. | | low temperature C. | | normal temperature R | | low temperature R | |
|---|---|---|---|---|---|---|---|---|
| | 0 h | 520 h | 0 h | 520 h | 0 h | 520 h | 0 h | 520 h |
| G | 88.41 | 56.37 | 93.66 | 38.97 | 75.71 | 177.45 | 60.19 | 200.52 |
| H | 89.82 | 58.04 | 95.96 | 47.35 | 60.31 | 120.78 | 42.30 | 97.79 |
| J | 80.58 | 48.50 | 85.40 | 37.25 | 52.70 | 134.11 | 38.18 | 95.37 |
| K | 100.00 | 56.78 | 100.00 | 19.72 | 100.00 | 324.94 | 100.00 | 868.42 |

In Samples G-J, the electrode part contains the carbon particles of the second carbon material with a large number of greater fine pores. In Sample K, on the other hand, the electrode part does not contain the carbon particles of the second carbon material. As shown in Table 10, the capacitors shown as Samples G-J are lower in capacitance decrease and resistance increase, especially at the low temperature than Sample K. At the normal temperature, the capacitors shown as Samples G-J are better in resistance than the capacitor shown as Sample K, and are not very serious in capacitance decrease.

Thus, adding the electrode part with the carbon particles of the second carbon material allows the electrode part to have a value of α of greater than 0.022 so as to reduce a capacitance decrease and a resistance increase.

The porous particles such as the carbon particles of the second carbon material function not only as spacers for controlling the void conditions in the electrode part as describe above but also reservoirs for the electrolytic solution. Thus, the porous particles produce the remarkable effect of reducing the characteristic degradation.

As described above, in the electrode part of the capacitor electrode according to the present exemplary embodiment, the value of a is made greater than 0.022. This allows the voids that have the predetermined sizes and are large in occupancy and absolute amount to be formed around the carbon particles in the electrode part. This smooth the diffusion of ions inside the fine pores of the (activated) carbon particles and around the carbon particles, which adsorb and desorb ions during charge and discharge, allowing the capacitor to have higher durability and higher low-temperature characteristics.

INDUSTRIAL APPLICABILITY

The capacitor including the capacitor electrode according to the present invention degrades less in characteristics over long-term use and consequently has a longer lifespan. Therefore, the capacitor is expected to be used in cars and electronic apparatus, which require high reliability.

The invention claimed is:

1. A capacitor electrode comprising:
a conductive base member; and
an electrode part electrically connected to the base member and containing carbon particles of a first carbon material capable of adsorbing and desorbing ions, the electrode part further containing voids including:
  first voids with diameters of not less than 0.2 μm and not more than 1.0 μm; and
  second voids with diameters of not less than 0.05 μm and less than 0.2 μm, wherein:
$(V_A \times V_A)/(V_B \times M)$ is greater than 0.022, where $V_A$ is a sum of volumes of the first voids, $V_B$ is a sum of volumes of the second voids, and M is a volume of the electrode part, respectively per unit weight of the electrode part, and
the diameters of the voids ranging from 0.05 μm to 1.0 μm, both inclusive, have a maximum peak between 0.3 μm and 0.6 μm, both inclusive.

2. A capacitor electrode comprising:
a conductive base member; and
an electrode part electrically connected to the base member and containing carbon particles of a first carbon material capable of adsorbing and desorbing ions, the electrode part further containing voids including:
  first voids with diameters of not less than 0.2 μm and not more than 1.0 μm; and
  second voids with diameters of not less than 0.05 μm and less than 0.2 μm, wherein:
$(V_A \times V_A)/(V_B \times M)$ is greater than 0.022, where $V_A$ is a sum of volumes of the first voids, $V_B$ is a sum of volumes of the second voids, and M is a volume of the electrode part, respectively per unit weight of the electrode part,
each of the carbon particles has pores on a surface thereof, the pores including:
  first pores with diameters of not less than 2 nm and not more than 50 nm; and
  second pores with diameters of less than 2 nm,
a ratio of a sum of volumes of the first pores to a sum of volumes of the second pores is at least 0.2, and a ratio of the sum of the volumes of the first pores to a sum of volumes of all pores formed in the carbon particles is at least 0.2.

3. A capacitor electrode comprising:
a conductive base member; and
an electrode part electrically connected to the base member and containing carbon particles of a first carbon material capable of adsorbing and desorbing ions, the electrode part further containing voids including:
first voids with diameters of not less than 0.2 μm and not more than 1.0 μm; and
second voids with diameters of not less than 0.05 μm and less than 0.2 μm, wherein:
$(V_A \times V_A)/(V_B \times M)$ is greater than 0.022, where $V_A$ is a sum of volumes of the first voids, $V_B$ is a sum of volumes of the second voids, and M is a volume of the electrode part, respectively per unit weight of the electrode part,
the electrode part further contains porous particles each having pores on a surface thereof,
a total volume of the pores of the porous particles is larger than a total volume of the pores of the carbon particles of the first carbon material; and
a weight content of the carbon particles in the electrode part is greater than a weight content of the porous particles in the electrode part.

4. The capacitor electrode according to claim 3, wherein each of the carbon particles has pores on a surface thereof, the pores including:
first pores with diameters of not less than 2 nm and not more than 50 nm; and
second pores with diameters of less than 2 nm,
the pores of the porous particles include:
third pores with diameters of not less than 2 nm and not more than 50 nm; and
fourth pores with diameters of less than 2 nm, and
a ratio of a sum of volumes of the third pores with respect to a sum of volumes of the fourth pores is greater than a ratio of a sum of volumes of the first pores with respect to a sum of volumes of the second pores.

5. The capacitor electrode according to claim 3, wherein the porous particles are made of a second carbon material.

6. A capacitor comprising:
a first electrode;
a second electrode disposed opposite to the first electrode; and
an electrolytic solution sandwiched between the first electrode and the second electrode, wherein:
the first electrode comprises:
a conductive base member; and
an electrode part electrically connected to the base member and containing carbon particles of a first carbon material capable of adsorbing and desorbing ions, the electrode part further containing voids including:
first voids with diameters of not less than 0.2 μm and not more than 1.0 μm; and
second voids with diameters of not less than 0.05 μm and less than 0.2 μm,
$(V_A \times V_A)/(V_B \times M)$ is greater than 0.022, where $V_A$ is a sum of volumes of the first voids, $V_B$ is a sum of volumes of the second voids, and M is a volume of the electrode part, respectively, per unit weight of the electrode part, and
the diameters of the voids ranging from 0.05 μm to 1.0 μm, both inclusive, have a maximum peak between 0.3 μm and 0.6 μm, both inclusive.

7. A capacitor comprising:
a first electrode;
a second electrode disposed opposite to the first electrode; and
an electrolytic solution sandwiched between the first electrode and the second electrode, wherein;
the first electrode comprises:
a conductive base member; and
an electrode part electrically connected to the base member and containing carbon particles of a first carbon material capable of adsorbing and desorbing ions, the electrode part further containing voids including:
first voids with diameters of not less than 0.2 μm and not more than 1.0 μm; and
second voids with diameters of not less than 0.05 μm and less than 0.2 μm,
$(V_A \times V_A)/(V_B \times M)$ is greater than 0.022, where $V_A$ is a sum of volumes of the first voids, $V_B$ is a sum of volumes of the second voids, and M is a volume of the electrode part, respectively, per unit weight of the electrode part,
each of the carbon particles has pores on a surface thereof, the pores including:
first pores with diameters of not less than 2 nm and not more than 50 nm; and
second pores with diameters of less than 2 nm,
a ratio of a sum of volumes of the first pores to a sum of volumes of the second pores is at least 0.2, and
a ratio of the sum of the volumes of the first pores to a sum of volumes of all pores formed in the carbon particles is at least 0.2.

8. A capacitor comprising:
a first electrode;
a second electrode disposed opposite to the first electrode; and
an electrolytic solution sandwiched between the first electrode and the second electrode, wherein;
the first electrode comprises:
a conductive base member; and
an electrode part electrically connected to the base member and containing carbon particles of a first carbon material capable of adsorbing and desorbing ions, the electrode part further containing voids including:
first voids with diameters of not less than 0.2 μm and not more than 1.0 μm; and
second voids with diameters of not less than 0.05 μm and less than 0.2 μm,
$(V_A \times V_A)/(V_B \times M)$ is greater than 0.022, where $V_A$ is a sum of volumes of the first voids, $V_B$ is a sum of volumes of the second voids, and M is a volume of the electrode part, respectively, per unit weight of the electrode part,
the electrode part further contains porous particles each having pores on a surface thereof,
a total volume of the pores of the porous particles is larger than a total volume of the pores of the first carbon material; and
a weight content of the carbon particles in the electrode part is greater than a weight content of the porous particles in the electrode part.

9. The capacitor according to claim 8, wherein each of the carbon particles has pores on a surface thereof, the pores including:

first pores with diameters of not less than 2 nm and not more than 50 nm; and second pores with diameters of less than 2 nm, the pores of the porous particles include:

third pores with diameters of not less than 2 nm and not more than 50 nm; and fourth pores with diameters of less than 2 nm, and a ratio of a sum of volumes of the third pores with respect to a sum of volumes of the fourth pores is greater than a ratio of a sum of volumes of the first pores with respect to a sum of volumes of the second pores.

10. The capacitor according to claim 8, wherein the porous particles are made of a second carbon material.

11. A capacitor electrode comprising:

a conductive base member; and an electrode part electrically connected to the base member and containing activated carbon, the electrode part further containing voids including: first voids with diameters of not less than 0.2 μm and not more than 1.0 μm; and second voids with diameters of not less than 0.05 μm and less than 0.2 μm, wherein $(V_A \times V_A)/(V_B \times M)$ is greater than 0.022, where $V_A$ is a sum of volumes of the first voids, $V_B$ is a sum of volumes of the second voids, and M is a volume of the electrode part, respectively per unit weight of the electrode part.

12. A capacitor comprising:

a first electrode;

a second electrode disposed opposite to the first electrode; and an electrolytic solution sandwiched between the first electrode and the second electrode, wherein:

the first electrode comprises:

a conductive base member; and an electrode part electrically connected to the base member and containing activated carbon, the electrode part further containing voids including: first voids with diameters of not less than 0.2 μm and not more than 1.0 μm; and second voids with diameters of not less than 0.05 μm and less than 0.2 μm, and $(V_A \times V_A)/(V_B \times M)$ is greater than 0.022, where $V_A$ is a sum of volumes of the first voids, $V_B$ is a sum of volumes of the second voids, and M is a volume of the electrode part, respectively, per unit weight of the electrode part.

13. The capacitor according to claim 12, wherein:

the electrolytic solution infiltrates into the electrode part of the first electrode, and an ion content of the electrolytic solution existing between the carbon particles contained in the electrode part of the first electrode is greater than an ion content required to generate a capacitance of the first electrode.

14. The capacitor according to claim 12, wherein the electrolytic solution contains quaternary ammonium salt.

15. The capacitor according to claim 12, wherein the electrolytic solution contains at least one selected from 1-ethyl-2,3-dimethylimidazolium ion and ethyltrimethylammonium ion.

16. The capacitor according to claim 12, wherein the capacitor is an electric double layer capacitor.

* * * * *